United States Patent
Mader et al.

(10) Patent No.: US 11,011,189 B2
(45) Date of Patent: May 18, 2021

(54) READBACK WAVEFORM OVERSAMPLING METHOD AND APPARATUS

(71) Applicant: Seagate Technology LLC, Cupertino, CA (US)

(72) Inventors: Drew Michael Mader, Minneapolis, MN (US); Wenzhong Zhu, Apple Valley, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/854,377

(22) Filed: Apr. 21, 2020

(65) Prior Publication Data

US 2020/0251132 A1     Aug. 6, 2020

Related U.S. Application Data

(62) Division of application No. 16/412,928, filed on May 15, 2019, now Pat. No. 10,665,254.

(60) Provisional application No. 62/674,172, filed on May 21, 2018.

(51) Int. Cl.
*G11B 5/09*     (2006.01)
*G11B 5/00*     (2006.01)

(52) U.S. Cl.
CPC ........ *G11B 5/09* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,737,342 A * | 4/1998 | Ziperovich | G01R 31/318516 714/736 |
| 6,456,213 B1 | 9/2002 | Seng et al. | |
| 6,583,942 B2 | 6/2003 | Seng et al. | |
| 7,054,088 B2 | 5/2006 | Yamazaki et al. | |
| 8,094,397 B2 | 1/2012 | Eleftheriou et al. | |
| 8,139,301 B1 * | 3/2012 | Li | G11B 5/012 360/39 |
| 8,441,752 B1 * | 5/2013 | Song | G11B 20/10277 360/45 |
| 8,477,445 B2 | 7/2013 | Stein et al. | |
| 8,786,970 B2 | 7/2014 | Erden | |
| 9,818,447 B1 | 11/2017 | Zheng et al. | |
| 9,872,621 B2 | 1/2018 | Falconer et al. | |
| 10,665,254 B1 * | 5/2020 | Mader | G11B 5/09 |
| 2003/0137765 A1 * | 7/2003 | Yamazaki | G11B 5/09 360/39 |
| 2013/0141812 A1 * | 6/2013 | Stein | G11B 20/10435 360/51 |

(Continued)

*Primary Examiner* — Peter Vincent Agustin
(74) *Attorney, Agent, or Firm* — Mueting Raasch Group

(57) ABSTRACT

A read channel is configured to obtain an analog readback waveform from a magnetic recording medium of a disk drive at a sampling rate of one sample per one written bit. A buffer is coupled the read channel. Circuitry is configured to inject a plurality of different phase offsets into the read channel for each of a plurality of revolutions of the medium. The circuitry is also configured to store, in a buffer, an amplitude of the readback waveform for each of the different phase offsets. The circuitry is further configured to generate an oversampled readback waveform using the amplitudes stored in the buffer.

20 Claims, 12 Drawing Sheets

(56) References Cited

U.S. PATENT DOCUMENTS

2013/0250447 A1\* 9/2013 Erden .................. G11B 5/3948
360/51

\* cited by examiner

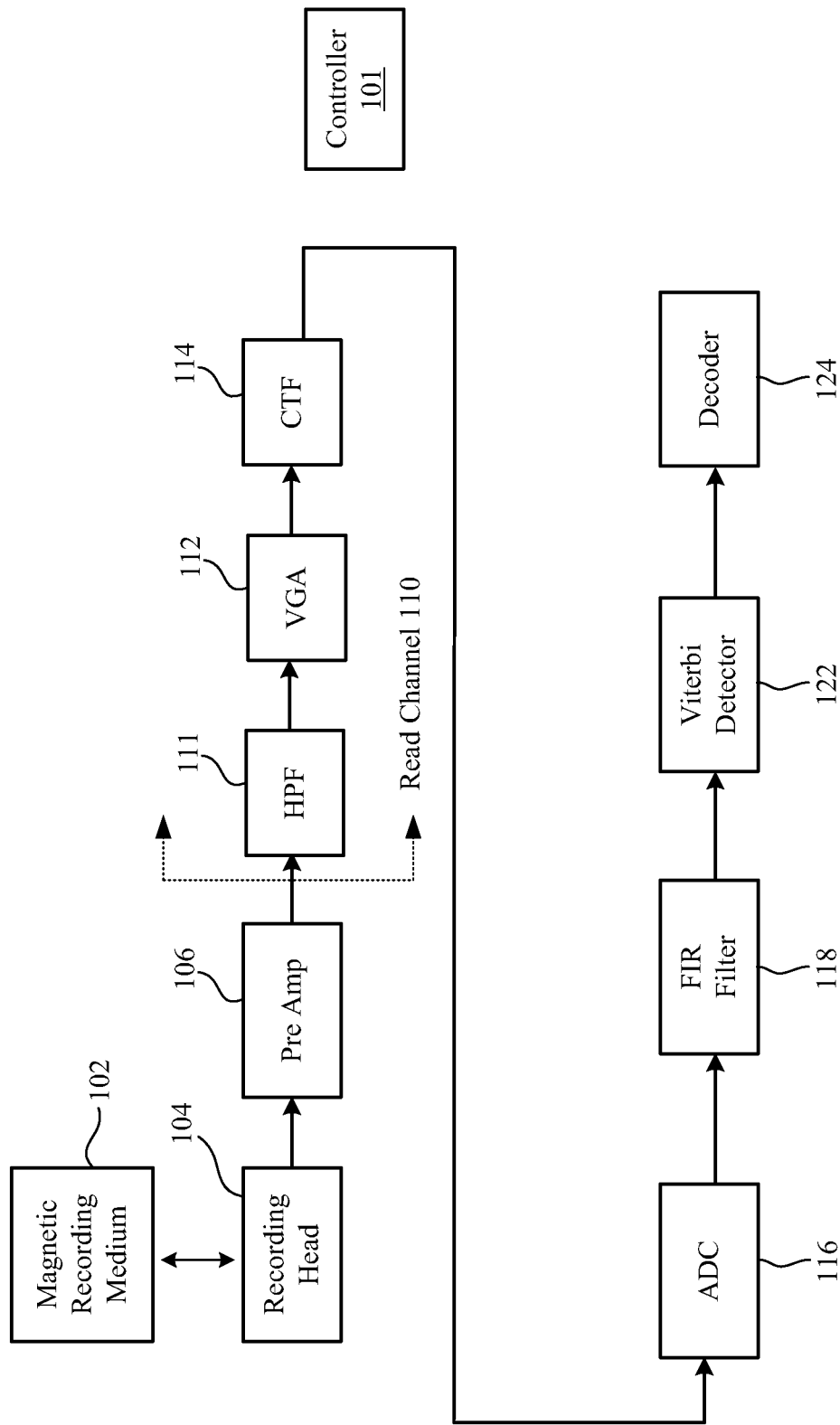

READBACK WAVEFORM OVERSAMPLING METHOD AND APPARATUS

RELATED APPLICATIONS

This application is a divisional of U.S. application Ser. No. 16/412,928, filed May 15, 2019, which claims the benefit of Provisional Patent Application Ser. No. 62/674,172 filed on May 21, 2018, which are hereby incorporated herein by reference in their entireties.

SUMMARY

Various embodiments are directed to a method comprising obtaining, via a read channel of a disk drive, a readback waveform from a magnetic recording medium at a sampling rate of one sample per one written bit. For each of a plurality of revolutions of the medium, the method comprises injecting a plurality of different phase offsets into the read channel to cause oversampling of the readback waveform at an oversampling rate higher than the sampling rate. The method also comprises measuring a metric or a phenomenon of disk drive operation that requires sampling of the readback waveform at the oversampling rate.

Some embodiments are directed to a method comprising obtaining, via a read channel of a disk drive, a readback waveform from a magnetic recording medium at a sampling rate of one sample per one written bit. For each of a plurality of revolutions of the medium, the method comprises injecting a plurality of different phase offsets into the read channel. The method also comprises storing, in a buffer, an amplitude of the readback waveform for each of the different phase offsets. The method further comprises generating an oversampled readback waveform using the amplitudes stored in the buffer.

Other embodiments are directed to an apparatus comprising a read channel configured to obtain an analog readback waveform from a magnetic recording medium of a disk drive at a sampling rate of one sample per one written bit. A buffer is coupled the read channel. Circuitry is configured to inject a plurality of different phase offsets into the read channel for each of a plurality of revolutions of the medium. The circuitry is also configured to store, in a buffer, an amplitude of the readback waveform for each of the different phase offsets. The circuitry is further configured to generate an oversampled readback waveform using the amplitudes stored in the buffer.

The above summary is not intended to describe each disclosed embodiment or every implementation of the present disclosure. The Figures and the detailed description below more particularly exemplify illustrative embodiments.

BRIEF DESCRIPTION OF THE DRAWINGS

FIG. 1 illustrates components of a hard disk drive (HDD) including a read channel in which oversampling of a readback waveform can be implemented according to various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 2A:
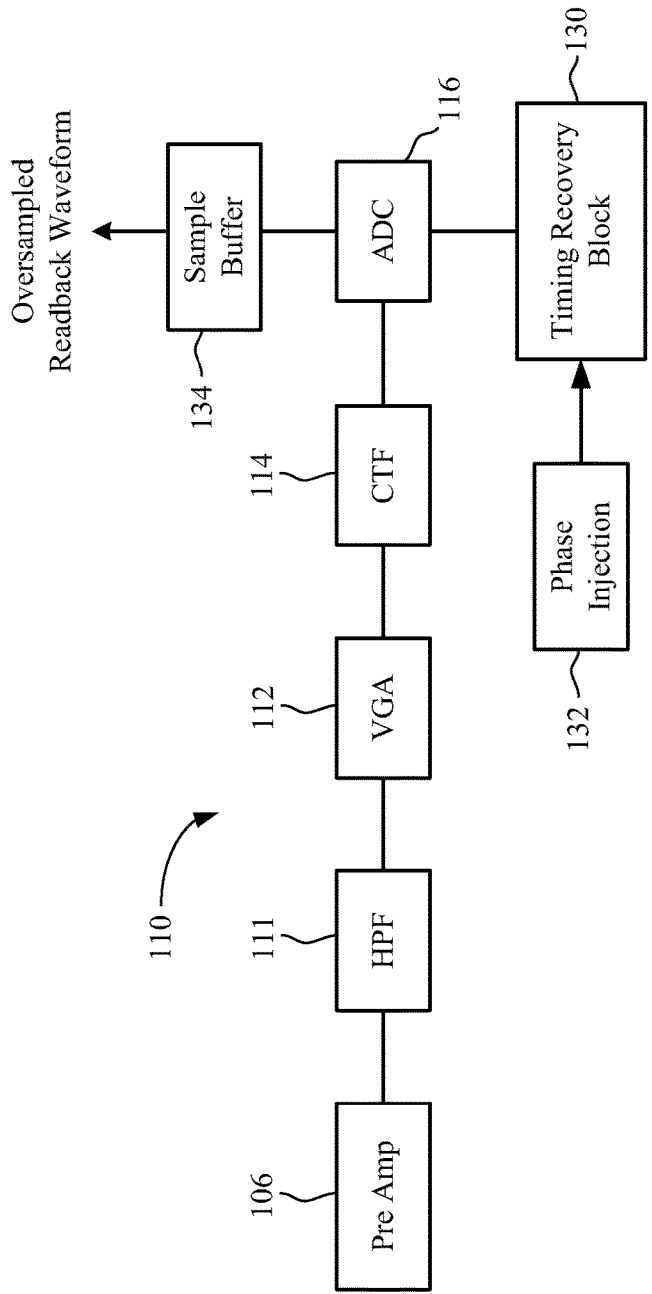
FIG. 2A illustrates a portion of the read channel shown in FIG. 1, and further shows components that, together with the read channel, are configured to implement readback waveform oversampling in accordance with embodiments of the disclosure.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

FIG. 1 illustrates components of a hard disk drive including a read channel with which oversampling of a readback waveform can be implemented according to various embodiments. The HDD includes a recording head 104 in proximity to a magnetic recording medium 102. The head 104 includes at least a reader and a writer. In some embodiments, the head 104 is configured for perpendicular magnetic recording (PMR). In other embodiments, the head 104 is configured for HAMR and, in addition to a reader and a writer, includes a near-field transducer (NFT) proximate the writer, a laser source, and an optical waveguide that optically couples laser light from the laser source to the NFT. The reader (e.g., a magneto-resistive reader) of the head 104 senses the magnetic flux from the medium 102 and generates an analog readback waveform. The reader of the head 104 transmits a resistance readback waveform that is received by preamplifier 106, which converts the resistance waveform into a voltage waveform. The preamplifier 106 provides the voltage readback waveform to a read channel 110, in which embodiments of the disclosure can be implemented. A controller 101 (e.g., a microprocessor, ASIC, or other general- or special-purpose logic circuitry) can be configured to coordinate operations of the components shown in FIG. 1 and in other figures.

The read channel 110 is generally configured to perform a partial response maximum likelihood (PRML) approach to detecting and decoding data read from the medium 102. Typical components of the read channel 110 include a high pass filter (HPF) 111, a variable gain amplifier (VGA) 112, a low pass filter 114 (e.g., a Continuous Time Filter or CTF), an analog-to-digital converter (ADC) 116, a digital filter 118 (e.g., a Finite Impulse Response or FIR filter), and a Viterbi detector 122 coupled to a decoder 124. The HPF 111 receives the readback waveform, in the form of a time-varying voltage waveform, from preamplifier 106, and high pass filters the readback waveform. The filtered readback waveform is received by the VGA 112, which produces an amplified readback waveform in accordance with the tolerances of ADC 116, and transfers the readback waveform to the CTF 114. The filtered readback waveform is sampled by ADC 116. The samples produced by the ADC 116 are passed through the FIR filter 118 to fit the samples to the desired channel response. These samples are then applied to the Viterbi detector 122 which generates encoded data that can be decoded by the decoder 124 to complete the maximum likelihood detection process.

FIG. 2A illustrates a portion of the read channel 110 shown in FIG. 1. FIG. 2 also shows components that, together with the read channel 110, are configured to implement readback waveform oversampling in accordance with embodiments of the disclosure. FIG. 2 shows a timing recovery block 130 coupled to the ADC 116. To compensate for differences between the frequency and phase at which data is written and read, timing recovery can be implemented by the timing recovery block 130. For example, the timing recovery block 130 can implement a method of timing recovery that synchronizes the sampling instances such that the frequency and phase at which the data is read corresponds to the phase and frequency at which it was written. In order to recover the desired sampling instances, timing recovery is implemented by the timing recovery block 130 for processing both the servo sectors and the data sectors. Servo sectors contain disk and track information written during manufacture that is utilized by the disk drive to determine the location of tracks and sectors on the magnetic recording disk. Data sectors are utilized to store and retrieve user data. Thus, timing recovery performance affects both servo performance (i.e., the operation of the servo to position the read/write head) and the performance of the data processing.

Figure 2B:
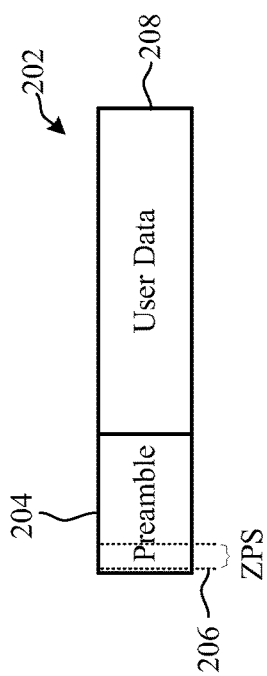
FIG. 2B illustrates representative data comprising a preamble and user data in accordance with embodiments of the disclosure.

The read channel 110 is configured to obtain an analog readback waveform from a magnetic recording medium of a disk drive at a sampling rate of one sample per one written bit. The timing recovery block 130 is configured to recover the written-in phase of a readback waveform. For example, and with reference to FIG. 2B, representative data 202 is shown to include a preamble 204 and user data 208. Among other information, the preamble 204 includes Zero Phase Start (ZPS) and other adaptation features 206 which can be used by the timing recovery block 130 to provide an estimate of the written-in phase at the beginning of the preamble 204. A phase injection block 132 is coupled to the timing recovery block 130. The timing recovery block 130 is configured to receive phase offset values generated by the phase injection block 132. The phase offset values produced by the phase injection block 132 represent phase offsets to the readback phase (nominal phase) recovered by the timing recovery block 130. The phase offsets can be positive and/or negative phase offsets to the written-in phase.

Injecting phase offsets into the read channel 110 via the timing recovery block 130 and the ADC 116 effectively changes the location where the ADC 116 is sampling the readback waveform. For example, the phase injection block 132 can inject a phase offset relative to the readback phase from −50% to +50% of the bit cell in a predetermined number of increments. In some embodiments, the predetermined number of increments can range between 2 and 32, which corresponds to an oversampling factor ranging between 2 and 32. For example, injecting a phase offset into the read channel 110 from −50% to +50% of the bit cell in 32 increments allows for a data pattern to be readback at plus or minus 50% of the nominal location, which corresponds to oversampling of the readback waveform by a factor of 32. A sample buffer 134 is coupled to the ADC 116. Sampling the readback waveform by the ADC 116 at a nominal phase offset and a multiplicity of different phase offsets injected into the read channel 110 results in the generation of an oversampled readback waveform in the sample buffer 134.

Figure 3:
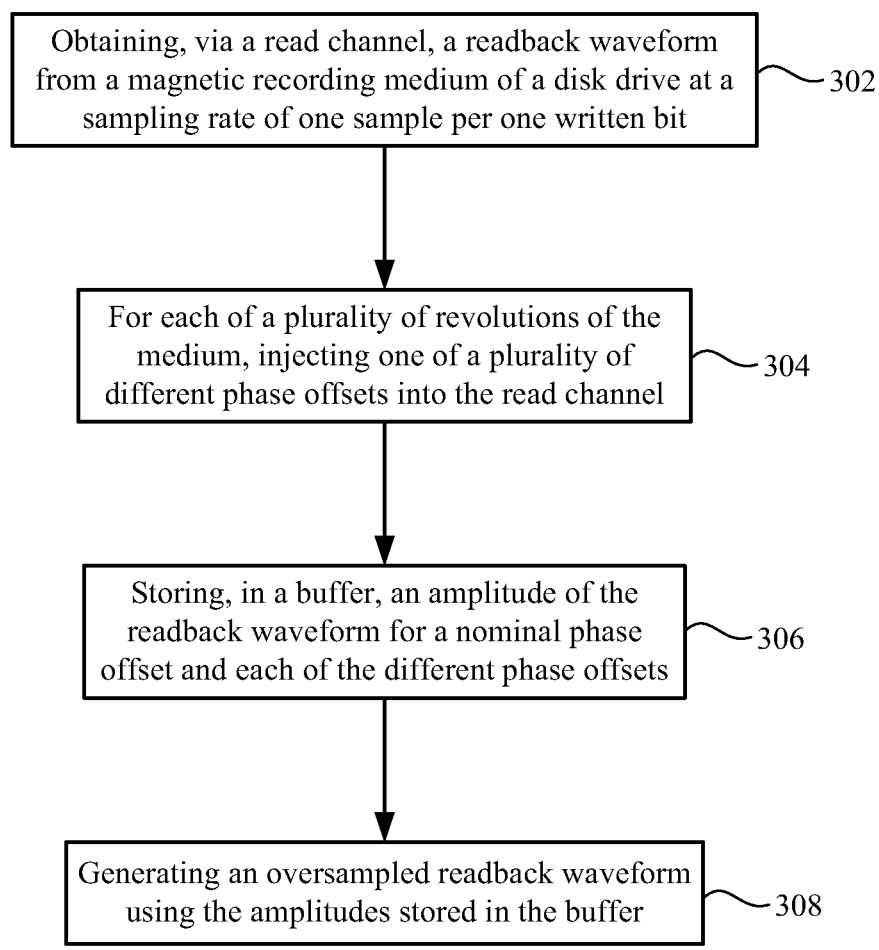
FIG. 3 shows a method of implementing readback waveform oversampling in accordance with various embodiments.

FIG. 3 shows a method of implementing readback waveform oversampling in accordance with various embodiments. The method shown in FIG. 3 involves obtaining 302, via a read channel, a readback waveform from a magnetic recording medium of a disk drive at a sampling rate of one sample per one written bit. For each of a plurality of revolutions of the medium, the method involves injecting 304 one of a plurality of different phase offsets into the read channel. The method involves storing 306, in a buffer, an amplitude of the readback waveform for a nominal phase offset and each of the different phase offsets. The method further involves generating 308 an oversampled readback waveform using the amplitudes stored in the buffer.

Figure 4:
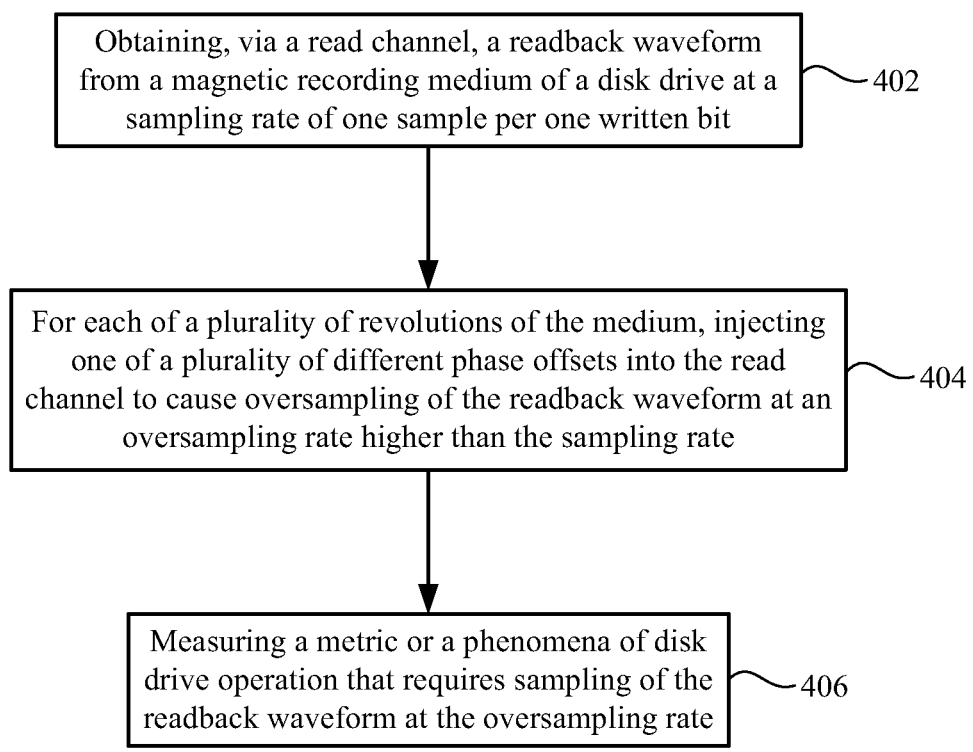
FIG. 4 shows a method of implementing readback waveform oversampling in accordance with various embodiments.

FIG. 4 shows a method of implementing readback waveform oversampling in accordance with other embodiments. The method shown in FIG. 4 involves obtaining 402, via a read channel, a readback waveform from a magnetic recording medium of a disk drive at a sampling rate of one sample per one written bit. For each of a plurality of revolutions of the medium, the method involves injecting 404 one of a plurality of different phase offsets into the read channel to cause oversampling of the readback waveform at an oversampling rate higher than the sampling rate. The method further involves measuring 406, by a processor of the disk drive, a metric or a phenomenon of disk drive operation that requires sampling of the readback waveform at the oversampling rate.

For example, an oversampled readback waveform generated from reading PRBS (pseudo-random binary sequence) patterns can be used to measure various metrics of disk drive operation, such as ensemble waveform signal-to-noise ratio (EWSNR), channel bit density (CBD), and dibit response. Measuring EWSNR, for example, typically requires oversampling of the readback waveform by a factor ranging between 2 and 8. Various phenomena of HAMR disk drive operation can be measured using an oversampled readback waveform, such as laser induced writer protrusion (LIWP), frequency mode hops, and a thermal gradient (TG). Measuring mode hops and a thermal gradient, for example, typically requires oversampling of the readback waveform by a factor of at least about 10.

In some embodiments, mode hops can be measured by reading many PRBS patterns written within a sector, and aligning them against each other to determine how much each has shifted relative to others and their expected location. This allows for increased resolution of the size and location of mode hops, and a better estimate of the number of mode hops. According to some embodiments, the thermal gradient can be measured by abruptly changing the laser power (ΔA) in the middle of a data sector (or a data wedge), giving rise to downtrack bit shifts (δ). The thermal gradient, TG, can be approximated by:

$$TG = (T_{Write} - T_{Ambient}) * \frac{\Delta A}{\delta}$$

where, $T_{Write}$ is the temperature at which data is written, and $T_{Ambient}$ is the ambient temperature of the media. The dibit response can be measured using an oversampled readback waveform in the manner described in commonly-owned U.S. Pat. No. 9,842,621, which is incorporated herein by reference. Mode hops can be measured using an oversampled readback waveform in the manner described in commonly-owned U.S. Pat. No. 9,818,447, which is incorporated herein by reference. Channel bit density can be measured using an oversampled readback waveform in the manner described in commonly-owned U.S. Pat. No. 9,947,362, which is incorporated herein by reference. EWSNR includes two noise sources: transition noise (also called jitter) and remanence noise. Transition noise refers to the SNR from writing a transition. The variation in writing the same location, for example, represents transition noise. This variation can be detected as a deviation of the SNR when writing a transition relative to a threshold. Remanence noise represents the variation in signal strength during a long mark, well away from a transition. Remanence noise can be detected as a deviation of the SNR when writing a long mark relative to a threshold.

Figure 5:
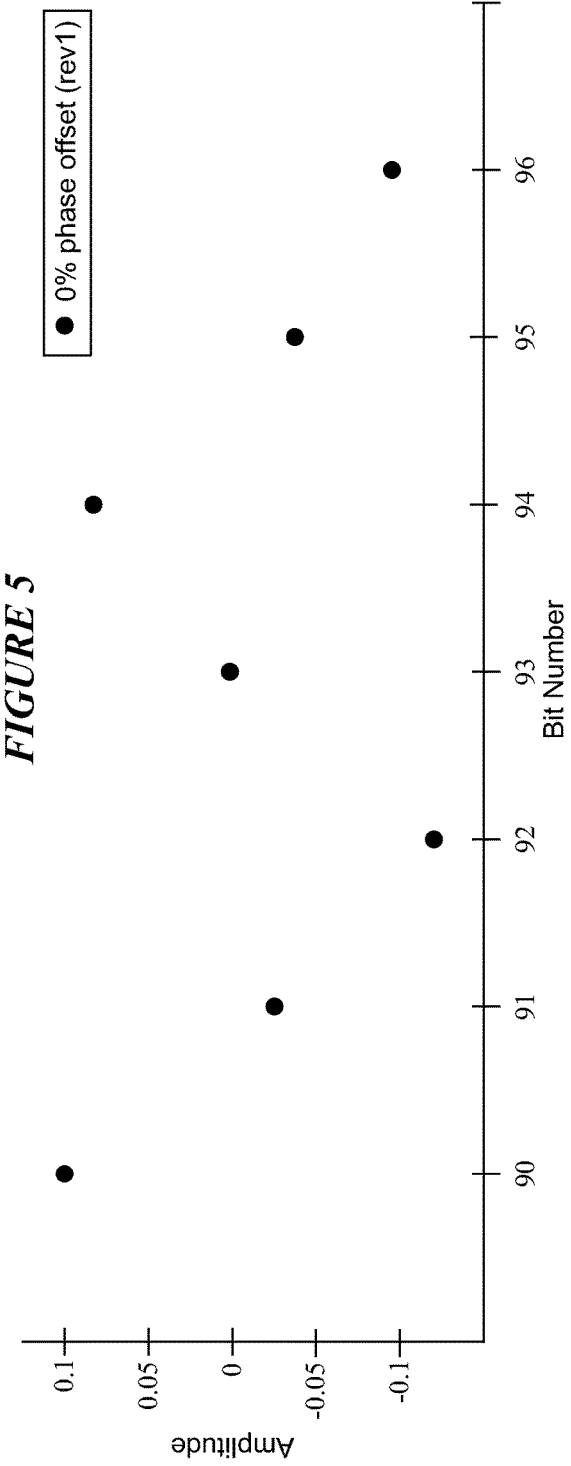
FIG. 5 is a representation of a readback waveform sampled at a sampling rate of one sample per one written bit during a first revolution of the magnetic recording medium in accordance with various embodiments.

FIGS. 5-8 facilitate an understanding of readback waveform oversampling in accordance with various embodiments. It is understood that the specific phase offsets and number of phase offsets associated with FIGS. 5-8 are provided for purposes of illustration and not of limitation. FIGS. 5-8 show graphs with amplitude along the y-axis and bit number along the x-axis. FIG. 5 is a representation of a readback waveform sampled at a sampling rate of one sample per one written bit during a first revolution of the magnetic recording medium. The amplitude of each sample acquired during a first revolution of the medium at a nominal phase is shown as a solid dot in FIG. 5. During the first revolution of the medium, the amplitude of each sample is stored in a buffer (e.g., a sample buffer).

Figure 6:
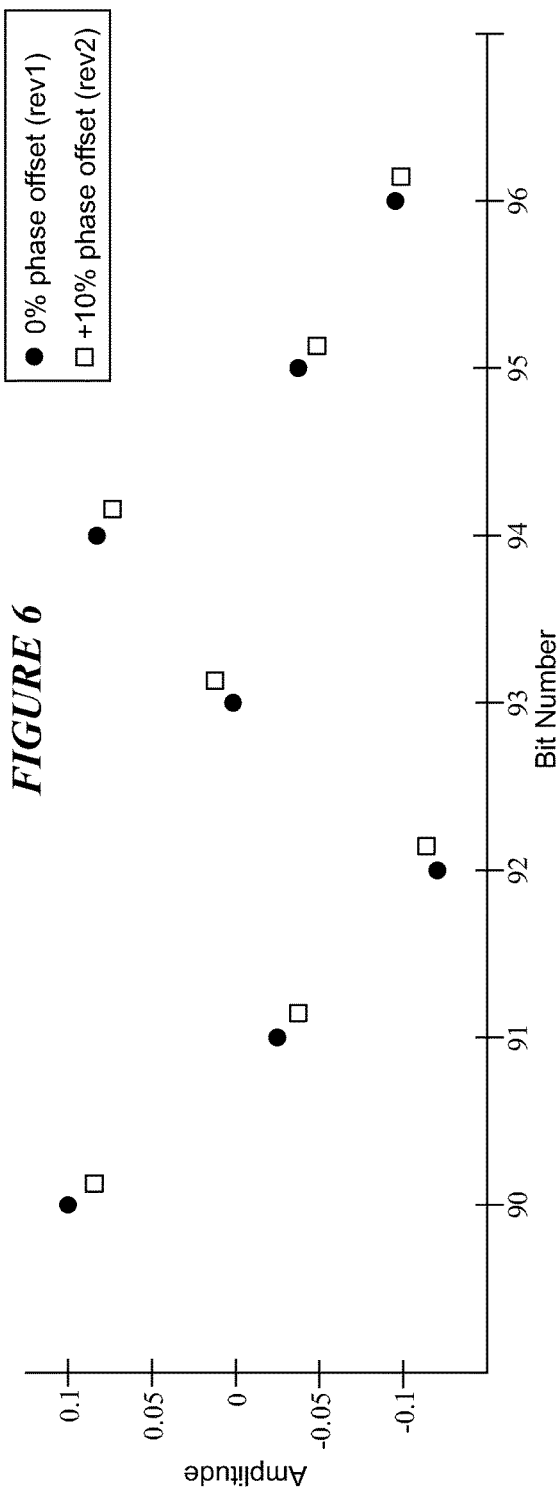
FIG. 6 is a representation of readback waveform sampled after injection of a +10% phase offset into the read channel in accordance with various embodiments.

At the completion of the first revolution of the medium, and with reference to FIG. 6, a +10% phase offset is injected into the read channel followed by sampling of the readback waveform during a second revolution of the medium. The amplitude of each sample acquired during the second revolution of the medium at a +10% phase offset is shown as a square. It can be seen in FIG. 6 that each sample denoted by a square is shifted in a positive direction along the x-axis by 10% of the distance between adjacent bits. As was discussed previously, injection of the phase offset changes the location where the channel is sampling the readback waveform. During the second revolution of the medium, the amplitude of each sample is stored in the buffer. The buffer now contains the amplitudes of readback waveform samples for the nominal phase offset (revolution 1) and the +10% phase offset (revolution 2).

Figure 7:
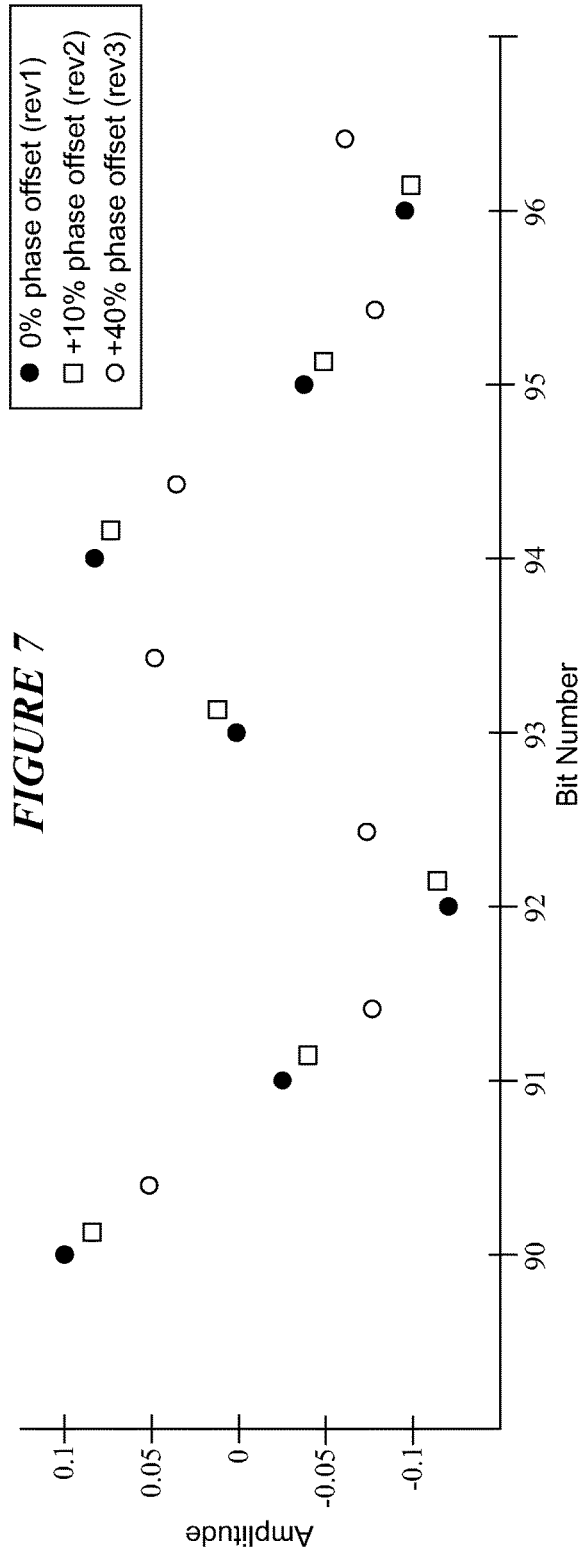
FIG. 7 is a representation of readback waveform sampled after injection of a +40% phase offset into the read channel in accordance with various embodiments.

At the completion of the second revolution of the medium, and with reference to FIG. 7, a +40% phase offset is injected into the read channel followed by sampling of the readback waveform during a third revolution of the medium. The amplitude of each sample acquired during the third revolution of the medium at a +40% phase offset is shown as a circle. It can be seen in FIG. 7 that each sample denoted by a circle is shifted in a positive direction along the x-axis by 40% of the distance between adjacent bits. During the third revolution of the medium, the amplitude of each sample is stored in the buffer. The buffer now contains the amplitudes of readback waveform samples for the nominal phase offset (revolution 1), the +10% phase offset (revolution 2), and the +40% phase offset (revolution 3).

Figure 8:
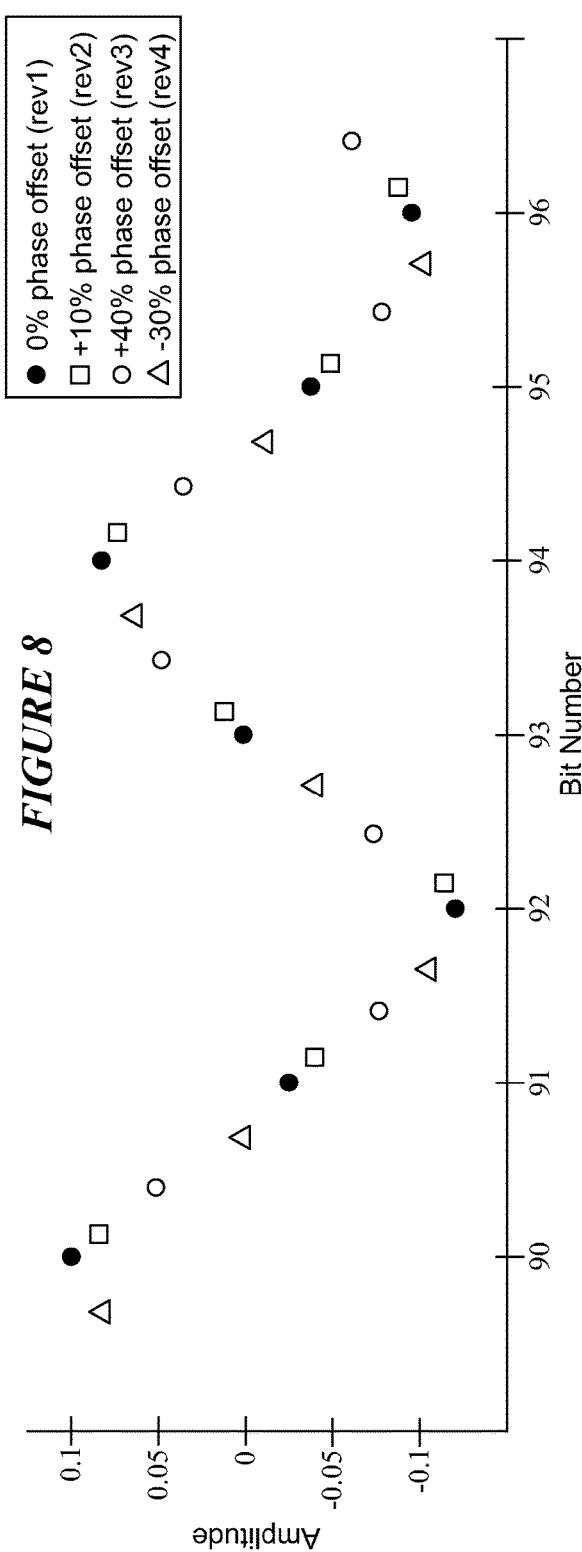
FIG. 8 is a representation of readback waveform sampled after injection of a −30% phase offset into the read channel in accordance with various embodiments.

At the completion of the third revolution of the medium, and with reference to FIG. 8, a −30% phase offset is injected into the read channel followed by sampling of the readback waveform during a fourth revolution of the medium. The amplitude of each sample acquired during the fourth revolution of the medium at a −30% phase offset is shown as a triangle. It can be seen in FIG. 8 that each sample denoted by a triangle is shifted in a negative direction along the x-axis by 30% of the distance between adjacent bits. During the fourth revolution of the medium, the amplitude of each sample is stored in the buffer. The buffer now contains the amplitudes of readback waveform samples for the nominal phase offset (revolution 1), the +10% phase offset (revolution 2), the +40% phase offset (revolution 3), and the −30% phase offset (revolution 4).

Figure 9:
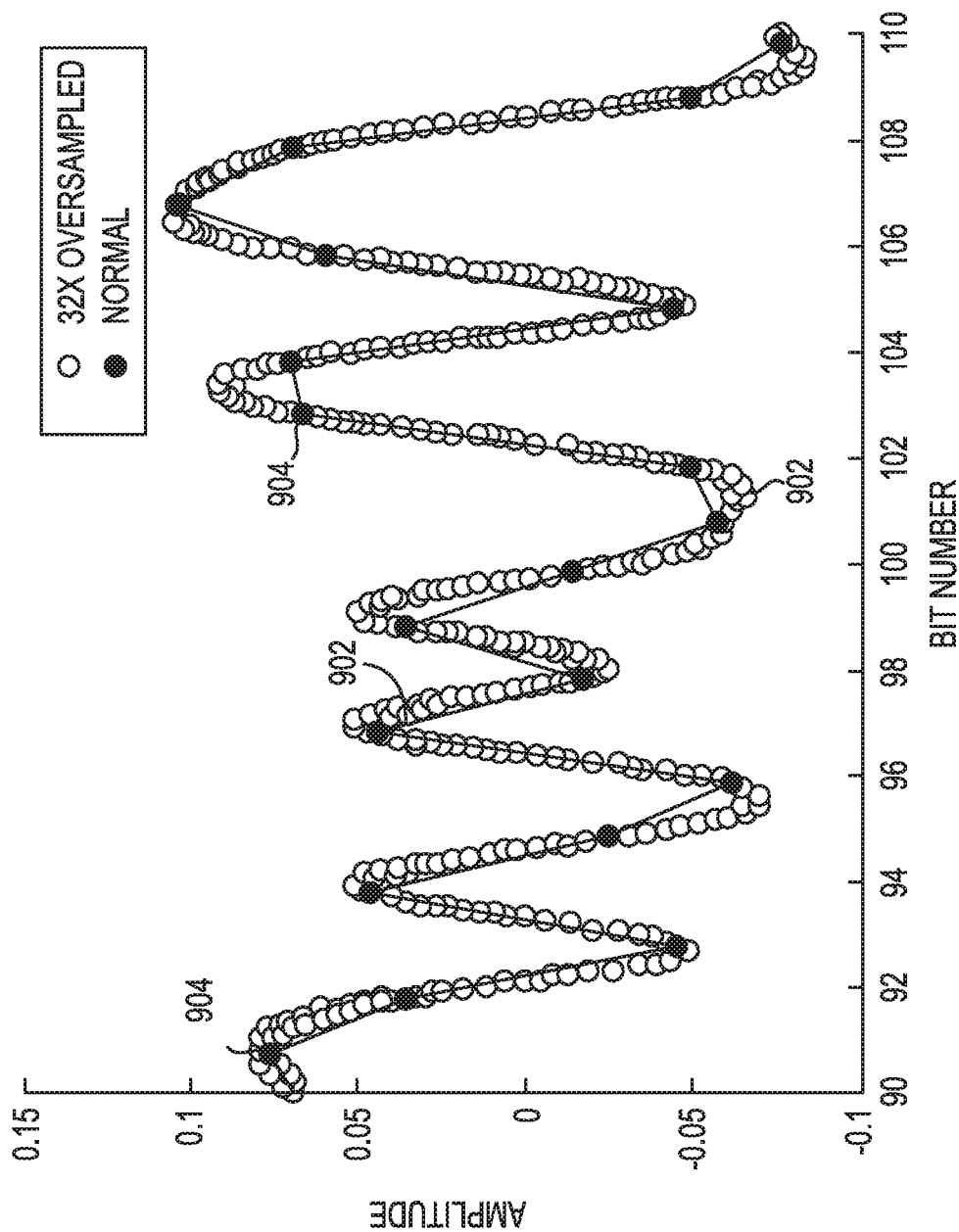
FIG. 9 shows an oversampled readback waveform in comparison to a nominal readback waveform (no oversampling) in accordance with various embodiments.

It is understood that the process of injecting a phase offset and sampling the readback waveform for each of a number of revolutions of the medium can continue until a desired rate of oversampling is achieved (e.g., 2×, 8×, 10×, 20×, 32×). FIG. 9 shows an oversampled readback waveform 902 in comparison to a nominal readback waveform 904 (no oversampling). The oversampled readback waveform 902 was generated in the manner discussed above and has an oversampling factor of 32 (e.g., 32 samples between adjacent bit cells). In contrast, the nominal readback waveform 904 was sampled at the nominal phase offset with no oversampling (e.g., 1 sample per bit cell). It can be seen that the oversampled readback waveform 902 has a significantly greater resolution than the nominal readback waveform 904. It is noted that a digital scope used in the factory to evaluate readback waveforms typically obtains 20 samples per written bit, whereas the oversampled readback waveform 902 obtains 32 samples per written bit, thus providing better resolution than the digital scope.

According to the embodiments discussed hereinabove, generating an oversampled readback waveform involves injection of a single phase offset into the read channel for each revolution of the magnetic recording medium. In accordance with other embodiments, generating an oversampled readback waveform involves injection of a multiplicity of phase offsets into the read channel for each revolution of the magnetic recording medium. Injecting a multiplicity of phase offsets into the read channel for each revolution of the medium advantageously results in a concomitant reduction in the number of reads and amount of time required to generate an oversampled readback waveform.

Figure 10:
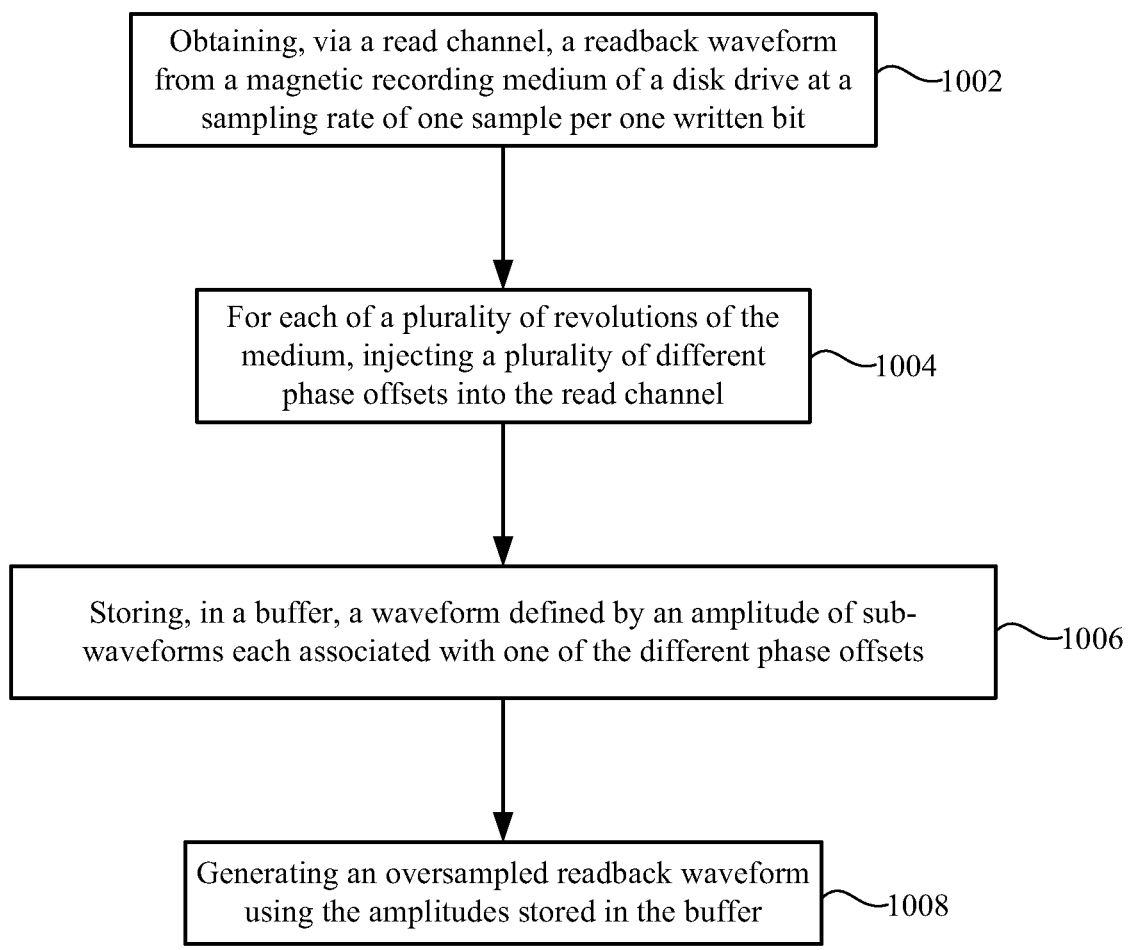
FIG. 10 shows a method of implementing readback waveform oversampling in accordance with various embodiments.

FIG. 10 shows a method of implementing readback waveform oversampling in accordance with various embodiments. The method shown in FIG. 10 involves obtaining 1002, via a read channel, a readback waveform from a magnetic recording medium of a disk drive at a sampling rate of one sample per one written bit. For each of a plurality of revolutions of the medium, the method involves injecting 1004 a plurality of different phase offsets into the read channel. The method involves storing 1006, in a buffer, a waveform defined by an amplitude of sub-waveforms each associated with one of the different phase offsets. The method further involves generating 1008 an oversampled readback waveform using the amplitudes stored in the buffer. The oversampled readback waveform is a waveform formed from the plurality of sub-waveforms each associated with one of the different phase offsets.

Figure 11:
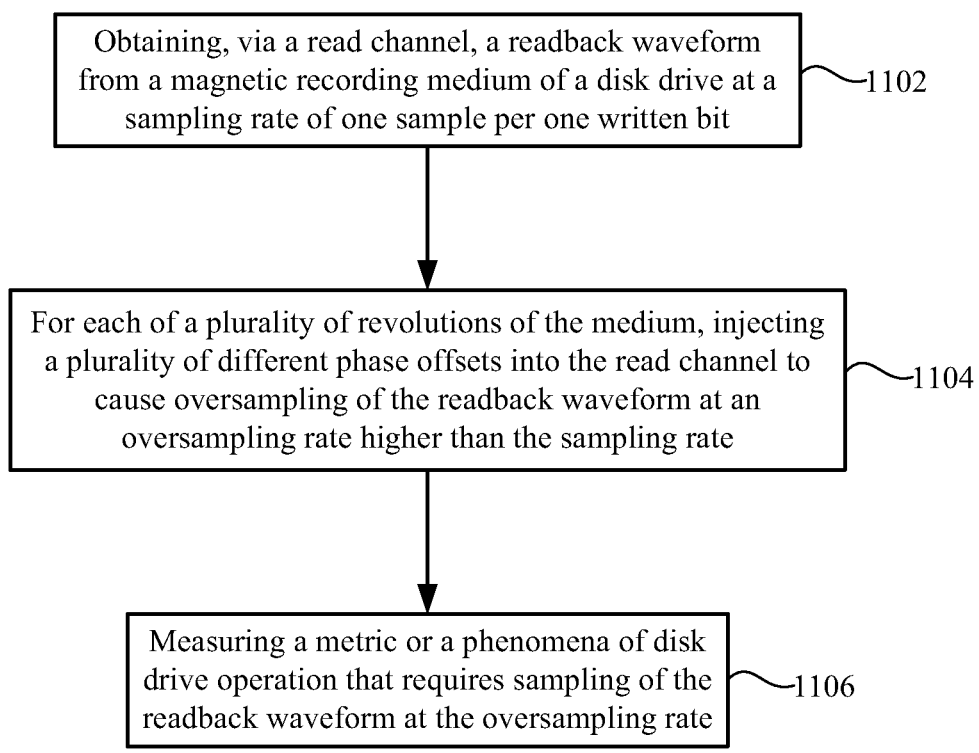
FIG. 11 shows a method of implementing readback waveform oversampling in accordance with various embodiments.

FIG. 11 shows a method of implementing readback waveform oversampling in accordance with other embodiments. The method shown in FIG. 11 involves obtaining 1102, via a read channel, a readback waveform from a magnetic recording medium of a disk drive at a sampling rate of one sample per one written bit. For each of a plurality of revolutions of the medium, the method involves injecting 1104 a plurality of different phase offsets into the read channel to cause oversampling of the readback waveform at an oversampling rate higher than the sampling rate. The method further involves measuring 1106, by a processor of the disk drive, a metric or a phenomenon of disk drive operation that requires sampling of the readback waveform at the oversampling rate.

Figure 12:
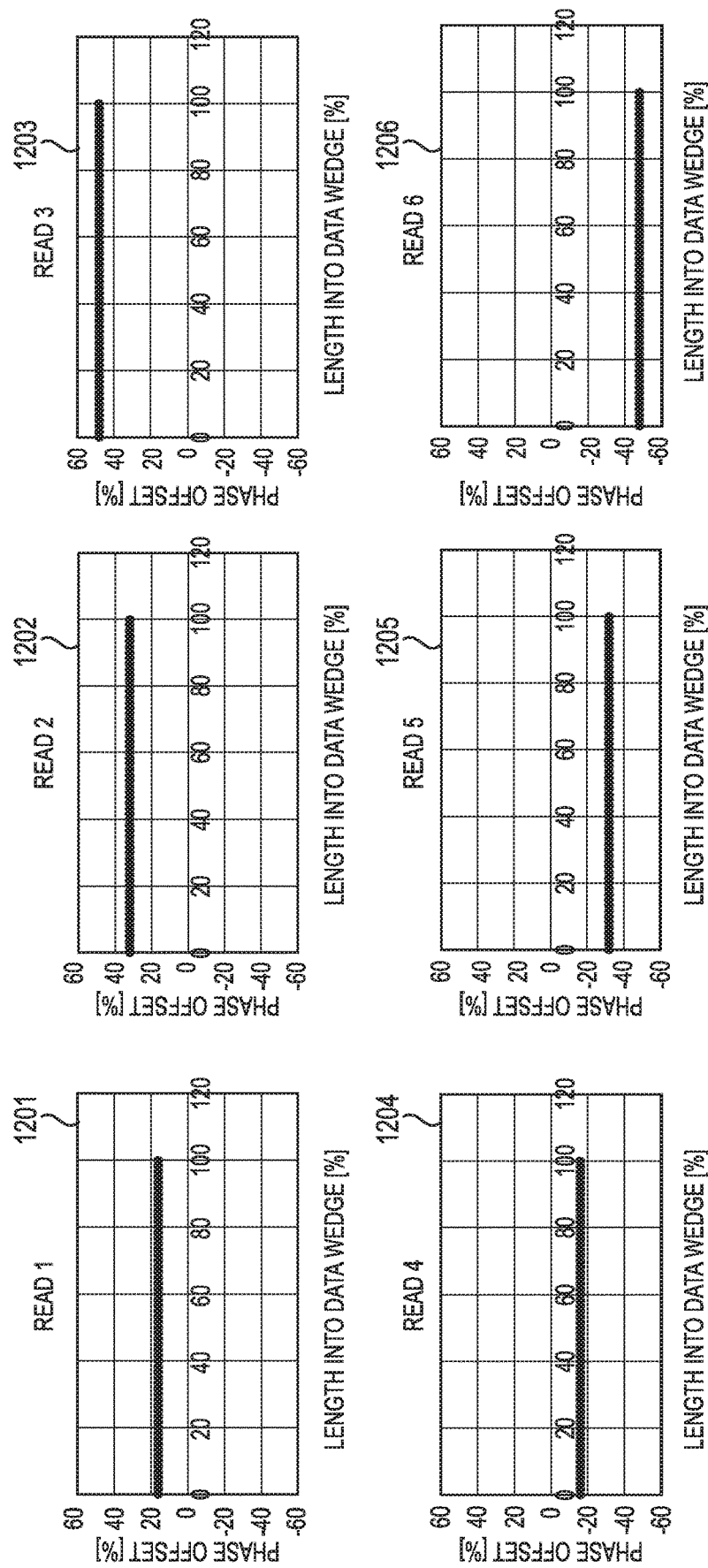
FIG. 12 illustrates an approach to generating an oversampled readback waveform by injecting one phase offset into the read channel for each revolution of the medium.
Figure 13:
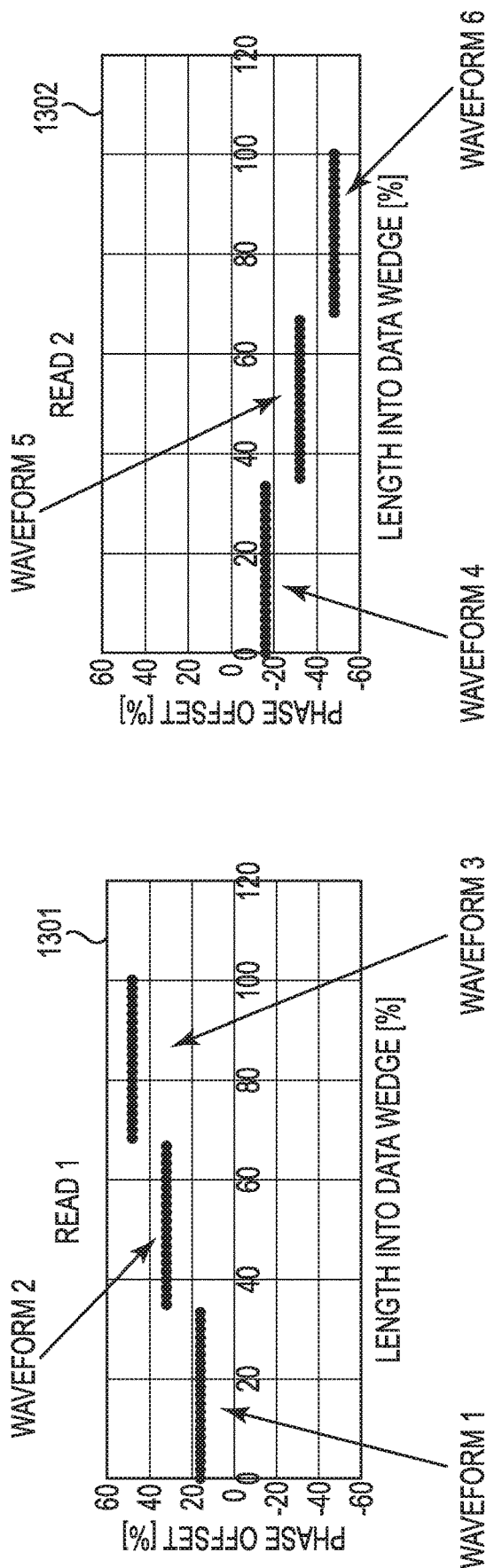
FIG. 13 illustrates an approach to generating an oversampled readback waveform by injecting a multiplicity of phase offsets into the read channel for each revolution of the medium.

For purposes of illustrating the advantages of injecting a multiplicity of phase offsets into the read channel for each revolution of the medium, reference is made to FIGS. 12 and 13. FIG. 12 illustrates an approach to generating an oversampled readback waveform by injecting one phase offset into the read channel for each revolution of the medium. FIG. 13 illustrates an approach to generating an oversampled readback waveform by injecting a multiplicity of phase offsets into the read channel for each revolution of the medium. In the graphs shown in FIGS. 12 and 13, the y-axis is the phase offset given in percentage, and the x-axis is the length into a data wedge given in percentage.

FIG. 12 shows injection of a single phase offset for each read of the data wedge. As shown, during a first revolution of the medium, a first read 1201 produces a single waveform that is sampled at a location associated with a phase offset of +18%. During a second revolution of the medium, a second read 1202 produces a single waveform that is sampled at a location associated with a phase offset of +35%. During a third revolution of the medium, a third read 1203 produces a single waveform that is sampled at a location associated with a phase offset of +50%. During a fourth revolution of the medium, a fourth read 1204 produces a single waveform that is sampled at a location associated with a phase offset of −18%. During a fifth revolution of the medium, a fifth read 1205 produces a single waveform that is sampled at a location associated with a phase offset of −35%. During a sixth revolution of the medium, a sixth read 1206 produces a single waveform that is sampled at a location associated with a phase offset of −50%. It can be seen in FIG. 12 that six reads (and six revolutions of the medium) are required to generate a readback waveform that is oversampled by a factor of 6 (6×).

FIG. 13 shows injection of a multiplicity of phase offsets for each read of the data wedge. As shown, during a first revolution of the medium, a first read 1301 produces three different waveforms (Waveforms 1-3), also referred to as sub-waveforms, that are sampled at a three different locations in the data wedge, each associated with a different phase offset. More particularly, the first read 1301 produces Waveform 1 which is sampled at a first location in the data wedge (between 0 and 35%) associated with a phase offset of +18%. The first read 1301 also produces Waveform 2 which is sampled at a second location in the data wedge (between 35 and 65%) associated with a phase offset of +35%. The first read 1301 further produces Waveform 3 which is sampled at a third location in the data wedge (between 65 and 100%) associated with a phase offset of +50%.

During a second revolution of the medium, a second read 1302 produces three different waveforms (Waveforms 4-6) that are sampled at a three different locations in the data wedge, each associated with a different phase offset. More particularly, the second read 1302 produces Waveform 4 which is sampled at a first location in the data wedge (between 0 and 35%) associated with a phase offset of −18%. The second read 1302 also produces Waveform 5 which is sampled at a second location in the data wedge (between 35 and 65%) associated with a phase offset of −35%. The second read 1302 further produces Waveform 6 which is sampled at a third location in the data wedge (between 65 and 100%) associated with a phase offset of −50%. It can be seen in FIG. 13 that two reads (and two revolutions of the medium) are required to generate a readback waveform that is oversampled by a factor of 6×. As was discussed previously, injecting a multiplicity of phase offsets into the read channel for each revolution of the medium advantageously results in a concomitant reduction in the number of reads and amount of time required to generate an oversampled readback waveform.

Readback waveform oversampling according to the present disclosure can be implemented in any type of hard disk drive (HDD), such as those configured for PMR and those configured for HAMR. In heat-assisted magnetic recording devices, also sometimes referred to as thermal-assisted magnetic recording (TAMR) devices or energy assisted magnetic recording (EAMR) devices, a magnetic recording medium (e.g., hard drive disk) is able to overcome superparamagnetic effects that limit the areal data density of typical magnetic media. In a HAMR disk drive, information bits are recorded on a storage layer at elevated temperatures. The heated area in the storage layer determines the data bit dimension, and linear recording density is determined by the magnetic transitions between the data bits.

In order to achieve desired data density, a HAMR recording head (e.g., slider) includes optical components that direct light from a laser to the recording media. In heat-assisted magnetic recording, a media hotspot (thermal hotspot) is created using the laser. This thermal hotspot generally needs to be smaller than a half-wavelength of light available from current light sources (e.g., laser diodes). Due to what is known as the diffraction limit, optical components cannot focus the light at this scale. One way to achieve tiny confined hot spots is to use an optical near-field transducer (NFT), such as a plasmonic optical antenna. The NFT is designed to support local surface-plasmons at a designed light wavelength. At resonance, a high electric field surrounds the NFT due to the collective oscillation of electrons in the metal. Part of the field impinges on the magnetic recording medium, raising the temperature of the medium locally for recording. During recording, a write element (e.g., write pole) applies a magnetic field to the heated portion (thermal hotspot) of the medium. The heat lowers the magnetic coercivity of the medium, allowing the applied field to change the magnetic orientation of the heated portion. The magnetic orientation of the heated portion determines whether a one or a zero is recorded. By varying the magnetic field applied to the magnetic recording medium while it is moving, data is encoded onto the medium.

Figure 14:
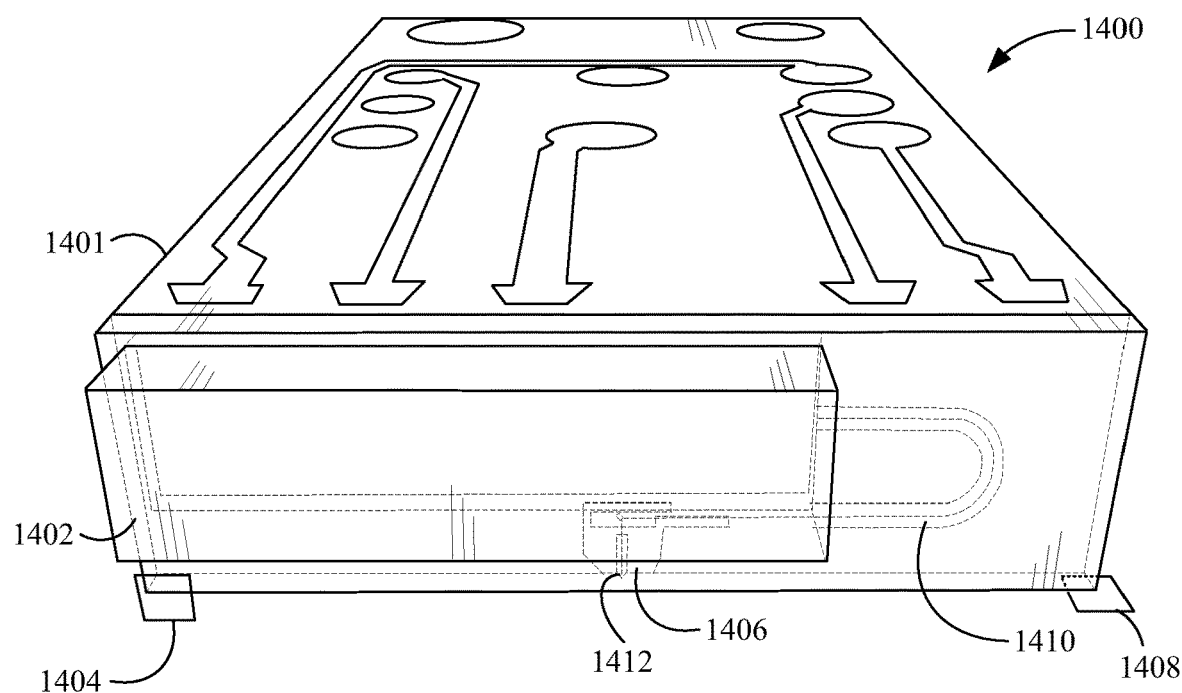
FIG. 14 shows a perspective view of a heat-assisted magnetic recording (HAMR) slider configuration according to some representative embodiments.
Figure 15:
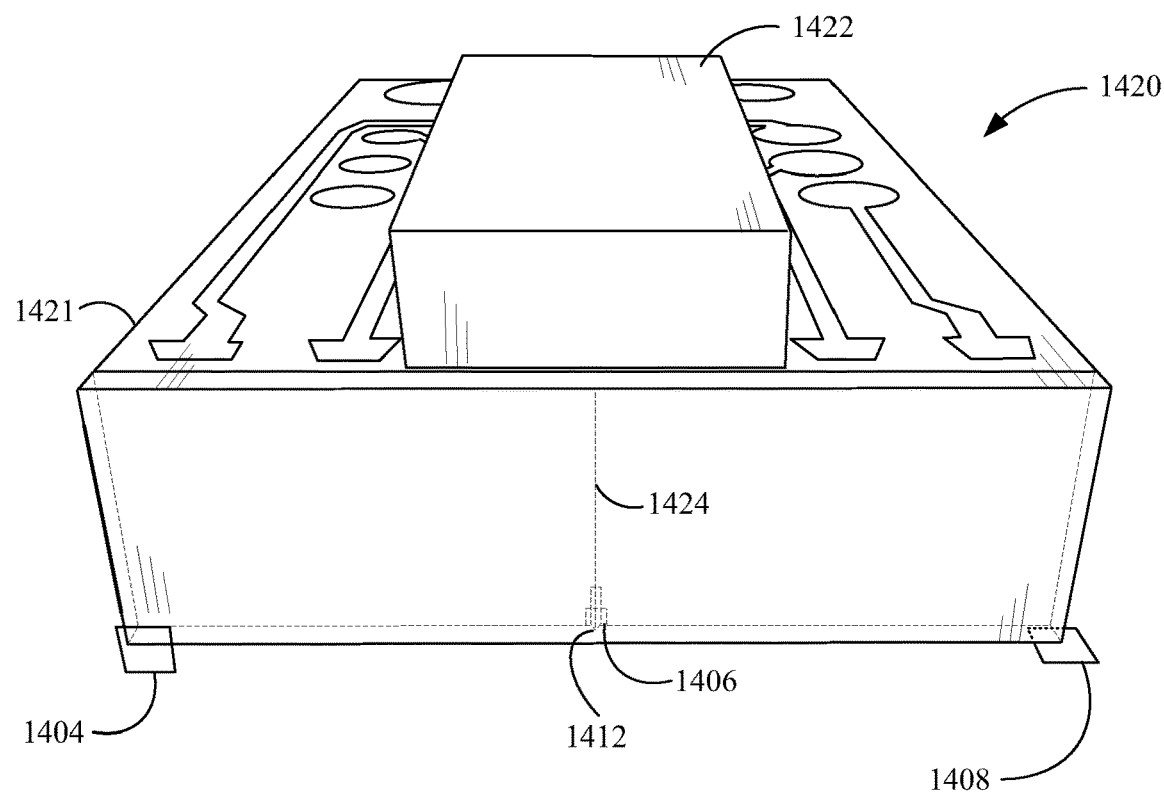
FIG. 15 shows a perspective view of a HAMR slider configuration according to other representative embodiments.

A HAMR disk drive, for example, uses a laser diode to heat the magnetic recording medium to aid in the recording process. FIGS. 14 and 15 show perspective views of HAMR slider configurations according to representative embodiments. For simplicity, like reference numbers are used in FIGS. 14 and 15. In FIG. 14, a slider 1400 has a laser-in-slider (LIS) configuration. In this configuration, the slider 1400 includes a slider body 1401 having an edge-emitting laser diode 1402 integrated into a trailing edge surface 1404 of the slider body 1401. In this example, the laser diode 1402 is disposed within a cavity formed in the trailing edge surface 1404. The laser diode 1402 is proximate to a HAMR read/write element 1406, which has one edge on an air bearing surface 1408 of the slider 1400. The air bearing surface 1408 faces and is held proximate to a moving magnetic media surface (not shown) during device operation.

While here the read/write element 1406 is shown as a single unit, this type of device may have a physically and electrically separate read element (e.g., magnetoresistive stack) and write element (e.g., a write coil and pole) that are located in the same general region of the slider 1400.

The separate read and write portion of the read/write element 1406 may be separately controlled (e.g., having different signal lines, different head-to-media spacing control elements, etc.), although may share some common elements (e.g., common signal return path). It will be understood that the concepts described relative to the read/write element 1406 may be applicable to individual read or write portions thereof, and may be also applicable where multiple ones of the read write portions are used, e.g., two or more read elements, two or more write elements, etc.

The laser diode 1402 provides electromagnetic energy to heat the media surface at a point near to the read/write element 1406. Optical path components, such as a waveguide 1410, are formed integrally within the slider 1400 to deliver light from the laser diode 1402 to the media. In particular, a local waveguide and NFT 1412 may be located proximate the read/write element 1406 to provide local heating of the media during write operations.

In FIG. 15, a laser-on-slider (LOS) configuration 1420 is illustrated. This example includes a laser diode 1422 that is mounted on a top surface of a slider body 1421. The laser diode 1422 is coupled to an optical path of the slider body 1421 that includes, among other things, an optical path 1424 (e.g., a straight waveguide). In this configuration, the laser diode 1422 may also be edge-emitting, such that the light is emitted from the laser diode 1422. In order to direct the light towards the air bearing surface 1408, the laser diode 1422 (or other component) may include optical path elements such as a mirror (not shown) that redirects the light emitted from the laser diode 1422 towards the air bearing surface 1408. In other configurations, an edge-emitting, top-mounted laser diode may be oriented so that the light emitted directly downwards toward the air bearing surface 1408. This may involve placing the laser diode 1422 on a submount (not shown) on the top of the slider body 1421, the submount orienting the laser output in the desired direction.

While other components shown in FIG. 15, such as the NFT 1412 and read/write element 1406, are referenced using the same numbers as FIG. 14, the physical configuration of these and other components may differ in the different slider arrangements, e.g., due to the differences in optical coupling pathways, materials, laser power, etc.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
  obtaining, via a read channel of a disk drive, a readback waveform from a magnetic recording medium at a sampling rate of one sample per one written bit;
  for each of a plurality of revolutions of the medium, injecting a plurality of different phase offsets into the read channel to cause oversampling of the readback waveform at an oversampling rate higher than the sampling rate; and
  measuring a metric or a phenomenon of disk drive operation that requires sampling of the readback waveform at the oversampling rate.

2. The method of claim 1, wherein the phase offsets range from a maximum negative phase offset to a maximum positive phase offset.

3. The method of claim 2, wherein the phase offsets range from about −50% to about +50% relative to a nominal phase of the readback waveform.

4. The method of claim 1, wherein:
  obtaining the readback waveform comprises recovering a written-in phase from a preamble of the readback waveform; and
  injecting the phase offsets comprises injecting positive phase offsets and negative phase offsets into the read channel relative to the written-in phase.

5. The method of claim 1, comprising:
  storing, in a buffer, an amplitude of the readback waveform for a nominal phase offset and each of the different phase offsets; and
  generating an oversampled readback waveform using the amplitudes stored in the buffer.

6. The method of claim 1, wherein the readback waveform is oversampled by a factor ranging from 2 to 32.

7. The method of claim 1, wherein the phenomenon of disk drive operation comprises one or both of a mode hop and a thermal gradient.

8. The method of claim 1, wherein the metric of disk drive operation comprises one or more of ensemble waveform signal-to-noise (EWSNR) ratio, channel bit density, and dibit response.

9. An apparatus, comprising:
  a read channel configured to obtain an analog readback waveform from a magnetic recording medium of a disk drive at a sampling rate of one sample per one written bit;

a buffer coupled to the read channel; and circuitry configured to:
for each of a plurality of revolutions of the medium, inject a plurality of different phase offsets into the read channel to cause oversampling of the readback waveform at an oversampling rate higher than the sampling rate; and measure a metric or a phenomenon of disk drive operation that requires sampling of the readback waveform at the oversampling rate.

10. The apparatus of claim 9, wherein the phase offsets range from a maximum negative phase offset to a maximum positive phase offset.

11. The apparatus of claim 10, wherein the phase offsets range from about −50% to about +50% relative to a nominal phase of the readback waveform.

12. The apparatus of claim 9, wherein:
the read channel is configured to obtain the readback waveform by recovering a written-in phase from a preamble of the readback waveform; and the circuitry is configured to inject positive phase offsets and negative phase offsets into the read channel relative to the written-in phase.

13. The apparatus of claim 9, wherein the circuitry is configured to:
store, in the buffer, an amplitude of the readback waveform for a nominal phase offset and each of the different phase offsets; and generate the oversampled readback waveform using the amplitudes stored in the buffer.

14. The apparatus of claim 9, wherein the readback waveform is oversampled by a factor ranging from 2 to 32.

15. The apparatus of claim 9, wherein the phenomenon of disk drive operation comprises one or both of a mode hop and a thermal gradient.

16. The apparatus of claim 9, wherein the metric of disk drive operation comprises one or more of ensemble waveform signal-to-noise (EWSNR) ratio, channel bit density, and dibit response.

17. The apparatus of claim 9, wherein the disk drive is a heat-assisted magnetic recording (HAMR) disk drive.

18. An apparatus, comprising:
a read channel configured to obtain an analog readback waveform from a magnetic recording medium of a disk drive at a predetermined sampling rate;

a buffer coupled to the read channel; and circuitry configured to:
inject a plurality of different phase offsets into the read channel to cause oversampling of the readback waveform at an oversampling rate higher than the predetermined sampling rate; and measure a metric or a phenomenon of disk drive operation that requires sampling of the readback waveform at the oversampling rate.

19. The apparatus of claim 18, wherein:
the phenomenon of disk drive operation comprises one or both of a mode hop and a thermal gradient; and the metric of disk drive operation comprises one or more of ensemble waveform signal-to-noise (EWSNR) ratio, channel bit density, and dibit response.

20. The apparatus of claim 18, wherein the disk drive is a heat-assisted magnetic recording (HAMR) disk drive.

* * * * *